(12) United States Patent
Marquart et al.

(10) Patent No.: US 12,122,344 B2
(45) Date of Patent: Oct. 22, 2024

(54) METHOD FOR CONTROLLING A POWER BRAKE SYSTEM CAPABLE OF CONTROLLING TRACTION ELECTRONICALLY, AND POWER BRAKE SYSTEM

(71) Applicant: Robert Bosch GmbH, Stuttgart (DE)

(72) Inventors: Martin Marquart, Reichenbach (DE); Helmut Suelzle, Pleidelsheim (DE); Patrick Lellmann, Oedheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 358 days.

(21) Appl. No.: 17/608,123

(22) PCT Filed: Mar. 18, 2020

(86) PCT No.: PCT/EP2020/057473
§ 371 (c)(1),
(2) Date: Nov. 1, 2021

(87) PCT Pub. No.: WO2020/224845
PCT Pub. Date: Nov. 12, 2020

(65) Prior Publication Data
US 2022/0194337 A1    Jun. 23, 2022

(30) Foreign Application Priority Data
May 9, 2019  (DE) .................. 10 2019 206 707.7

(51) Int. Cl.
*B60T 8/40* (2006.01)
*B60T 8/1755* (2006.01)
(Continued)

(52) U.S. Cl.
CPC .......... *B60T 8/4081* (2013.01); *B60T 8/1755* (2013.01); *B60T 13/662* (2013.01); *B60T 13/686* (2013.01);
(Continued)

(58) Field of Classification Search
CPC ................. B60T 8/4081; B60T 13/662; B60T 2270/406; B60T 8/1755; B60T 2270/402; B60T 13/686; B60T 17/18
See application file for complete search history.

(56) References Cited

U.S. PATENT DOCUMENTS 7,396,088 B2    7/2008 Nilsson
10,926,748 B2*  2/2021 Besier ................... B60T 8/4086
(Continued)

FOREIGN PATENT DOCUMENTS

CN    106458176 A    2/2017
DE    19732229 A1    3/1998
(Continued)

OTHER PUBLICATIONS

International Search Report for PCT/EP2020/057473, Issued May 19, 2020.

*Primary Examiner* — Pamela Rodriguez
(74) *Attorney, Agent, or Firm* — NORTON ROSE FULBRIGHT US LLP; Gerard A. Messina

(57) ABSTRACT

A method for controlling a power brake system, for a motor vehicle engaged in piloted driving, which includes two electrically controllable actuator units. The first actuator unit includes a braking-intent detection device, and a first pressure generation unit for generating a brake pressure in a brake circuit. The second actuator unit includes a second pressure generation unit redundant to the first pressure generation unit. A first electronic control device acquires signals of the braking-intent detection device and controls
(Continued)

the actuator unit based on the detected braking intent. In response to detected functional impairment, the first motor of the pressure generation unit ceases to be controlled, and the second motor of the pressure generation unit of the second actuator unit is controlled to generate brake pressure. Detection of a braking intent and wheel-specific modulation of the brake pressure, continue to be carried out, using devices of the first actuator unit.

5 Claims, 2 Drawing Sheets

(51) Int. Cl.
    *B60T 13/66*     (2006.01)
    *B60T 13/68*     (2006.01)

(52) U.S. Cl.
    CPC ... *B60T 2270/402* (2013.01); *B60T 2270/406* (2013.01)

(56) References Cited

U.S. PATENT DOCUMENTS

| | | | |
|---|---|---|---|
| 2002/0050739 | A1 | 5/2002 | Koepff et al. |
| 2007/0222284 | A1* | 9/2007 | Matsubara ............. B60T 8/885 |
| | | | 303/122.04 |
| 2011/0077831 | A1 | 3/2011 | Nishino et al. |
| 2017/0129468 | A1* | 5/2017 | Besier .................. B60T 8/4086 |
| 2020/0290583 | A1* | 9/2020 | Narematsu ............ B60T 13/686 |

FOREIGN PATENT DOCUMENTS

| | | |
|---|---|---|
| DE | 102010056006 A1 | 6/2012 |
| DE | 102012205962 A1 | 11/2012 |
| DE | 102015221725 A1 | 5/2017 |
| DE | 102015226568 A1 | 6/2017 |
| DE | 102018202287 A1 | 8/2019 |
| JP | 2011073535 A1 | 4/2011 |
| JP | 2011189905 A | 9/2011 |
| WO | 2019081413 A1 | 5/2019 |

* cited by examiner

METHOD FOR CONTROLLING A POWER BRAKE SYSTEM CAPABLE OF CONTROLLING TRACTION ELECTRONICALLY, AND POWER BRAKE SYSTEM

FIELD

The present invention relates to a method for controlling a power brake system capable of controlling traction electronically, in particular, for a motor vehicle engaged in piloted driving, as well as to a motor vehicle engaged in piloted driving.

Power brake systems in motor vehicles, capable of controlling traction electronically, have the distinction that at least under normal operating conditions of these systems, the brake pressure is not generated by muscle power of the driver. In power brake systems, in order to input a braking intent, the driver simply manipulates a braking-intent detection device, by which signals corresponding to the manipulation are then transmitted to an electronic control device of an actuator unit. This electronic control device converts the incoming signals to control signals, by which a motor of a pressure generator of an actuator unit is controlled. As a result, using external power, the actuator unit builds up a brake pressure, which corresponds to the manipulation, in at least one brake circuit of the brake system.

Regarding the use of power brake systems in vehicles engaged in piloted driving, for reasons of safety, such power brake systems are equipped with a second electronically controllable actuator unit. The latter includes a second pressure generator unit redundant with respect to the pressure generation unit of the first actuator unit. Until now, in the case of an occurring malfunction of the first actuator unit, the second pressure generator unit has been utilized for generating the brake pressure. In order to protect their functionality, the actuator units are controlled by electronic control devices independent of each other and are also assigned to independent voltage supplies.

A failure of the first actuator unit may be attributed to different reasons, such as an electrical or mechanical defect of a valve of a pressure modulation device of the first actuator unit and/or a faulty voltage supply, due to which the assigned electronic control device is unable to procure the power required of the motor to generate the desired brake pressure.

To be sure, in the case of a malfunction of the first actuator unit, the vehicle continues to be decelerated by the second actuator unit in a reliable manner, but if the malfunction occurs during a proceeding braking action, then this change of actuator unit generating the brake pressure is perceptible to the driver due to a changed braking performance of the power brake system. The reason for this is that due to the damaged, first actuator unit, the braking-intent detection device assigned to the first actuator unit is no longer available, and therefore, the current braking intent may only be derived indirectly from sensor signals of the second actuator unit. In addition, in the event of a failure of the first actuator unit, the valves of a pressure modulation device of the first actuator unit are no longer available for wheel-specific brake pressure regulation, which means that the usual traction control and/or vehicle stability control functions of the power brake system are only available in a limited manner.

Therefore, there is a need to counteract, in a timely manner, a malfunction of the first actuator unit that is imminent due to an inadequate power supply, in order to respond to such functional or performance changes of the power brake system, and in order to initiate necessary countermeasures. In this connection, it is possible for a warning signal to be transmitted to the driver.

German Patent Application Nos. DE 102010056006 A1 or DE 102015221725 A1 describe methods and devices, with the aid of which an imminent malfunction of a first actuator unit may be detected in a timely manner.

A hydraulic circuit diagram of a power brake system, which is capable of controlling traction electronically, has two actuator units, and forms the basis of the present invention, is described, for example, from German Patent Application No. DE 10 2018 202 287 A1.

SUMMARY

An example embodiment of the present invention provides that in the preliminary stages of a potential malfunction of the first actuator unit, functions of the power brake system, which are associated with a high current demand on this first actuator unit, be transferred to the second actuator unit.

Thus, the brake pressure build-up demanding a large amount of electrical power is undertaken by the pressure generator of the second actuator unit, and consequently, the electrical load on the power supply of the first actuator unit is reduced.

The latter results in a minimization of the risk of a possible voltage dip at the first actuator unit and consequently counteracts an imminent reset of the electronic control device of the first actuator to the initial state. Due to the low electric power requirement of its sensors and actuators, such as the pressure modulation unit, the braking-intent detection device of the first actuator unit continues to operate, which means that the braking intent may still be detected immediately and may also be utilized by the control device of the second actuator unit as an input variable for generating brake pressure. Due to this, the braking performance of the power brake system changes only slightly for a driver, even in the case of a malfunction of the first actuator unit.

In addition, traction control functions of the power brake system continue to be available, since due to their likewise low demand for electric power, the relevant, requisite valves of the pressure modulation device of the first actuator unit are still supplied with electric power adequately in spite of the present functional impairment.

According to an example embodiment of the present invention, during a proceeding braking action, in response to the detection, by a suitable monitoring device, of a functional limitation of the voltage supply of the first actuator unit preceding a malfunction, the control of the motor of the first actuator unit is canceled, and in its place, the motor of the pressure generation unit of the second actuator unit is controlled for setting and regulating the brake pressure in the brake circuit.

Further advantages or advantageous further refinements of the present invention are described herein.

In accordance with an example embodiment of the present invention, the signals of the braking-intent detection device of the first actuator unit are advantageously taken as a basis during the determination of a control signal to the motor unit of the second actuator unit.

A device for monitoring the voltage supply of the first actuator unit may be integrated in the electronic control device of the first or the second actuator unit or may be connected as a separate unit to the voltage supply of an actuator unit.

BRIEF DESCRIPTION OF THE DRAWINGS

In the following description, an exemplary embodiment of the present invention is explained in detail with reference to the figures.

DETAILED DESCRIPTION OF EXAMPLE EMBODIMENTS

Figure 1:
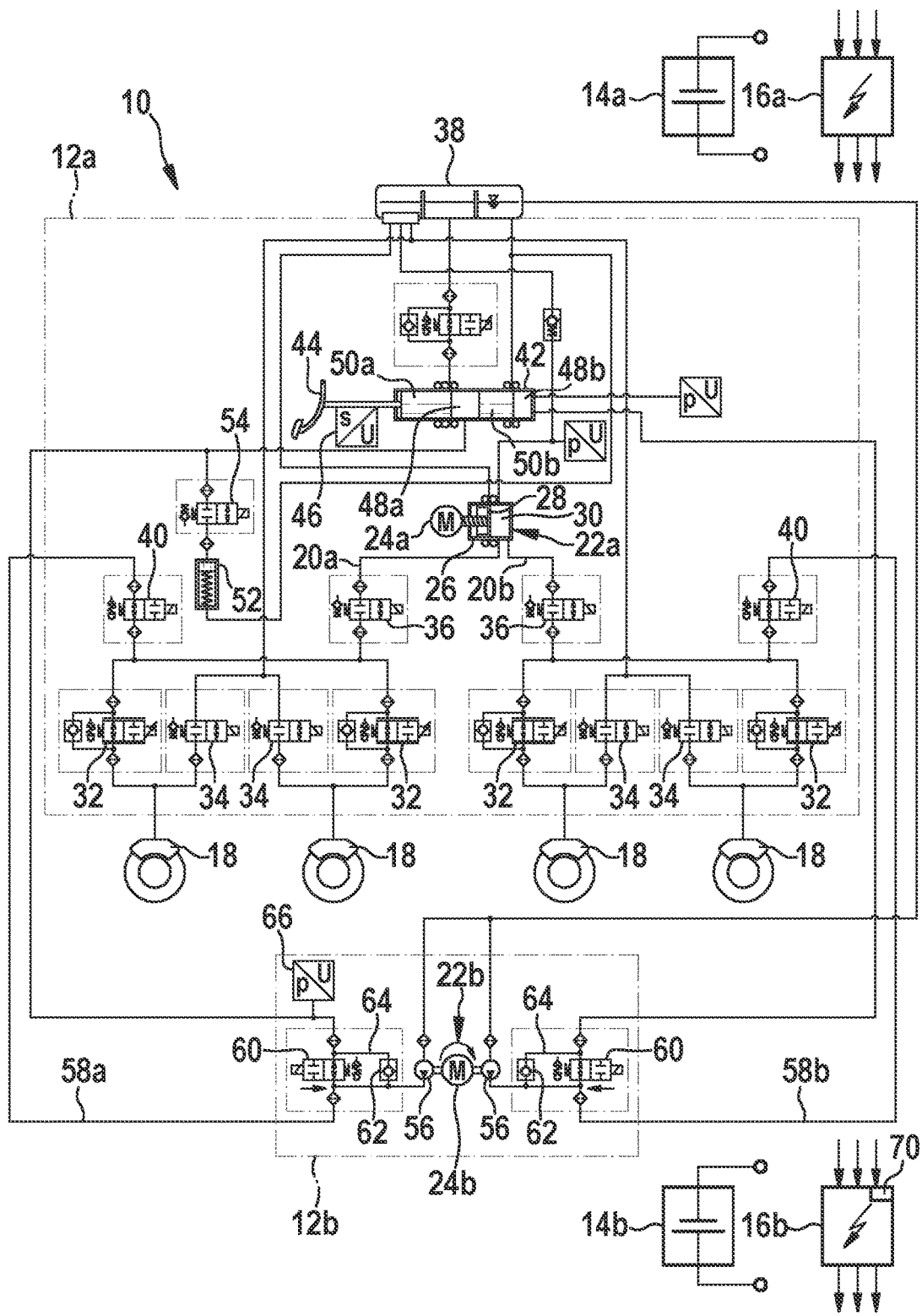
FIG. 1 shows the hydraulic circuit diagram of a power brake system from the related art, which forms the basis of the present invention, which is capable of controlling traction electronically, and is intended, in particular, for a motor vehicle engaged in piloted driving.

The power brake system 10 capable of controlling traction electronically, which is shown in FIG. 1, is made up of two actuator units 12a; 12b interconnected hydraulically. The two actuator units 12a; 12b each have a separate respective voltage supply 14a; 14b, which is independent of the other actuator unit, as well as a separate electronic control device 16a; 16b.

First actuator unit 21a supplies a total of four wheel brakes 18 connected to it, with pressurized media under brake pressure. For that purpose, in each instance, two wheel brakes 18 are combined in one of a total of two brake circuits 20a; 20b. Under normal operating conditions of power brake system 10, the brake pressure in these brake circuits 20 is built up by a pressure generation unit 22a of first actuator unit 12a. That pressure generation unit 22a includes an electronically controllable motor 24a for operating a plunger unit made up of a plunger cylinder 26 and a plunger piston 28 displaceably contained in it. The latter is driven into translatory motion by motor 24a via an interconnected gear unit and, in this context, displaces pressurized media from a plunger working chamber 30 of the plunger unit into the two connected brake circuits 20a; 20b. As a result, a brake pressure builds up in brake circuits 20a; 20b; the magnitude of the brake pressure being a function of the volume of pressurized media displaced into them and, consequently, in the end, the actuating distance traveled by plunger piston 28.

To adjust this brake pressure in a wheel-specific manner, to the slip conditions at each of the wheels of the motor vehicle, first actuator unit 12a further includes a pressure modulation device. In each instance, that is made up of one pressurized-media intake valve 32 and one pressurized-media exhaust valve 34 per wheel brake 18 present. These valves may be actuated electronically, and in the case of pressurized-media intake valves 32, they may be transitioned from a through position to a blocking position, or in the case of pressurized-media exhaust valves 34, they may be transitioned from a blocking position to a through position. Pressurized-media exhaust valves 34 may be control valves, while pressurized-media intake valves 32 may take the form of proportioning valves for the purpose of regulating brake pressure more effectively.

Each brake circuit 20a; 20b is equipped with a so-called plunger control valve 36 between pressure modulation device 32, 34 and plunger unit 26, 28, 30. The pressurized media connections between this plunger unit 26, 28, 30 and brake circuits 20a; 20b are controllable with the aid of this plunger control valve 36. Contrary to the depicted normal position, which shows the valves in the unenergized state, plunger control valves 36 are energized, and therefore open, in the normal operating state of power brake system 10. They are closed, as needed, for a limited time, when plunger piston 28 reaches its outer reversal point, and, due to a reversal in the direction of movement of plunger piston 28, plunger working chamber 30 is to be filled with fresh pressurized media via pressurized media connections leading directly to a reservoir 38 for pressurized media.

In addition, each brake circuit 20a; 20b is provided with a circuit separating valve 40. These circuit separating valves 40 are connected in parallel with plunger control valves 36 and control two pressurized media connections, via which first actuator unit 12a is contacted with second actuator unit 12b. Circuit separating valves 40 are implemented as control valves, which are normally open and, under normal operating conditions, may be switched over to a blocking position via electronic control.

Furthermore, first actuator unit 12a also includes a braking-intent detection device. That is made up of a master brake cylinder 42, which is operable by an actuating element that is implemented, as an example, in the form of a brake pedal 44. An actuation travel of brake pedal 44 is measured by a displacement sensor system 46 and supplied to the first control device 16a assigned to first actuator unit 12a. From the displacement signal, this control device 16a determines a control signal for motor 24a of pressure generation unit 22a of first actuator unit 12a.

Master brake cylinder 42 includes two cylinder chambers 48a; 48b, which are delimited by associated master brake cylinder pistons 50a; 50b, respectively. When brake pedal 44 is manipulated, at least one of master brake cylinder pistons 50 is moved in a direction, in which the volume of associated cylinder chamber 48 decreases. The two cylinder chambers 48 are connected to reservoir 38 for pressurized hydraulic media. Two ducts carrying pressurized media extend from cylinder chambers 48 of master brake cylinder 42 to second actuator unit 12b, and there, they are contacted with the pressure side of second pressure generation unit 22b.

Finally, first actuator unit 12a also includes a pedal travel simulator 52. It is a device made of a simulator piston, which is displaceable in opposition to the force of an elastic restoring element in a simulator cylinder. A simulator chamber enclosed by the simulator piston and simulator cylinder is in pressurized-media communication with the first cylinder chamber 48a of master brake cylinder 42 facing brake pedal 44, via a controllable simulator control valve 54. In the case of a simulator control valve 54 open under normal operating conditions of power brake system 10, the simulator chamber receives pressurized media displaced from this first cylinder chamber 48a of actuated master brake cylinder 42. Consequently, it allows actuating travel of brake pedal 44 without pressurized media being transported, in this instance, from first actuator unit 12a to second actuator unit 12b.

Second actuator unit 12b is also split up into two pressurized media circuits 58a; 58b separated from each other. These pressurized media circuits 58a; 58b are constructed substantially identically, and brake pressure may be applied to them by a second pressure generator unit 22b redundant with respect to pressure generation unit 22a of first actuator unit 12a. For this, second pressure generator unit 22b is made up of a total of two pump elements 56, which may be driven jointly by controllable second motor 24b. A suction side of each pump element 56 is contacted directly with reservoir 38 for pressurized media. On the pressure side, each pump element 56 of second actuator unit 12b is contacted with one of the two brake circuits 20a; 20b of first actuator unit 12a upstream from respective circuit separating valve 40. Each pressurized media circuit 58a; 58b of second actuator unit 12b further includes a controllable switchover valve 60. If necessary, these switchover valves 60 establish a hydraulic connection between the pressure side of a pump element 56 of second actuator unit 12b and a circuit separating valve 40 of first actuator unit 12a, or between the pressure side of pump element 56 of second actuator unit 12b and a cylinder chamber 48 of master brake cylinder 42. By transitioning switchover valve 60 from its blocking position to its through position, the brake pressure of pressurized media circuits 58a, 58b, and consequently, the pressure pressure generation unit 22b of second actuator unit 12b applies to wheel brakes 18, may be regulated. These switchover valves 60 are control valves, which are normally open, and with which a bypass 64 controlled by a check valve 62 is connected in parallel. Check valve 62 prevents pressurized media from escaping from the pressure side of a pump element 56 to master brake cylinder 42, when switchover valve 60 is closed, and simultaneously allows the driver to apply brake pressure to wheel brakes 18 in the case of an active second actuator unit 12b, by actuating master brake cylinder 42.

A pressure sensor 66 in the pressurized media connection of second actuator unit 12b with master brake cylinder 42 measures the brake pressure selected by the driver. Up to now, in the event of a malfunction of first actuator unit 12a, this measured value has represented the present braking intent, which is used by electronic control device 16b of second actuator unit 12b as an input variable for ascertaining the control signal for motor 24b of pump elements 56 of second actuator unit 12b.

During trouble-free operation of power brake system 10, a driver manipulates brake pedal 44 in accordance with his/her braking intent. In this instance, when simulator control valve 54 is open, pressurized media is displaced from the master brake cylinder chamber 48 connected to pedal travel simulator 52, to the simulator chamber, and brake pedal 44 travels a distance corresponding to this. This pedal travel is measured by displacement sensor system 46 of the braking-intent detection device of first actuator unit 12a and supplied to electronic control device 16a of this first actuator unit 12a as an input value. From the measured pedal travel, control device 16a ascertains a control signal for motor 24a of first pressure generation unit 22a, which consequently builds up a brake pressure proportional to this pedal travel in brake circuits 20a. This brake pressure is optionally adjusted by pressurized-media intake valves 32 and pressurized-media exhaust valves 34 of the modulation device, in a wheel-specific manner, to the slip conditions prevailing at the respective, assigned wheel.

During this normal brake operation, second actuator unit 12b is passive and, accordingly, not involved in the explained build-up of brake pressure and/or the control of the brake pressure. In this context, circuit separating valves 40 of first actuator unit 12a assume their blocking position and consequently decouple second actuator unit 12b hydraulically from first actuator unit 12a.

According to the related art, in response to its malfunction, the valves of first actuator unit 12a assume the normal positions represented in the drawing. In this normal position, plunger control valves 36, simulator control valve 54, and pressurized-media exhaust valves 34 are closed, while circuit separating valves 40 and pressurized-media intake valves 32 are open.

Due to its separate voltage supply 14b, and due to its separate electronic control device 16b, second actuator unit 12b is fully functional in spite of the malfunction of first actuator unit 12a.

Consequently, the electronic control of switchover valves 60 of second actuator unit 12b results in the connection of the pressure side of pump elements 56 with master brake cylinder 42 being broken, while a connection of the pressure side of pump elements 56 with brake circuits 20 of first actuator unit 12a is established via open circuit separating valves 40.

Accordingly, by operating pump elements 56 of second actuator unit 12b via electrical control of associated motor 24b, the brake pressure necessary for applying wheel brakes 18 is built up. In this case, the braking intent is derived in a conventional manner from the signal of pressure sensor 66 of second actuator unit 12b. To that end, the pressure sensor signal is converted by electronic control device 16b of second actuator unit 12b to a control signal, by which motor 24b is controlled. The brake pressure generated by pump elements 56 travels through open circuit separating valves 40 and likewise-open pressurized-media intake valves 32 of first actuator unit 12a, to connected wheel brakes 18.

As explained at the outset, determining the braking intent with the aid of the signal of pressure sensor 66 of second actuator unit 12b is not completely satisfactory, since the braking performance of power brake system 10 changes in a manner noticeable to the driver due to the indirect measurement of the braking intent.

The present invention counters this disadvantage by transferring the generation of brake pressure by first actuator unit 12a to second actuator unit 12b during a proceeding braking action, not only when first actuator unit 12a has already malfunctioned, but already in the preliminary stages of an expected malfunction of first actuator unit 12a, that is, when functional limitations or instances of implausibility in the voltage supply of first actuator unit 12a have been determined by one of the methods from the related art. Such functional limitations or instances of implausibility may precede a malfunction and may be detected early by a device 70 monitoring voltage supply 14a of first actuator unit 12a. Such a monitoring device 70 may be integrated in control device 16a of first actuator unit 12a or in control device 16b of second actuator unit 12b.

By transferring the function of building up pressure to redundant pressure generator unit 22b of second actuator unit 12b early, the electrical load of the voltage supply of first actuator unit 12a decreases, and the risk of a voltage dip is reduced. Therefore, first actuator unit 12a continues to function normally with the exception of the pressure generation function. Accordingly, using the working braking-intent detection device 42-46, input variables directly representing the braking intent are available; the input variables being able to be used as input variables by electronic control device 16b of second actuator unit 12b for determining a control signal for motor 24b to drive pump elements 56. Due to this, the brake pressure generated by second actuator unit 12b continues to correlate quite highly with the current braking intent of the driver, and changes in the braking performance of a power brake system 10 during a proceeding braking action are scarcely detectable by the driver anymore. In addition, the pressurized-media intake valves 32 and pressurized-media exhaust valves 34 of the pressure modulation device of first actuator unit 12*a*, which also continue to operate, continue to allow the driving stability of the vehicle to be regulated.

Figure 2:
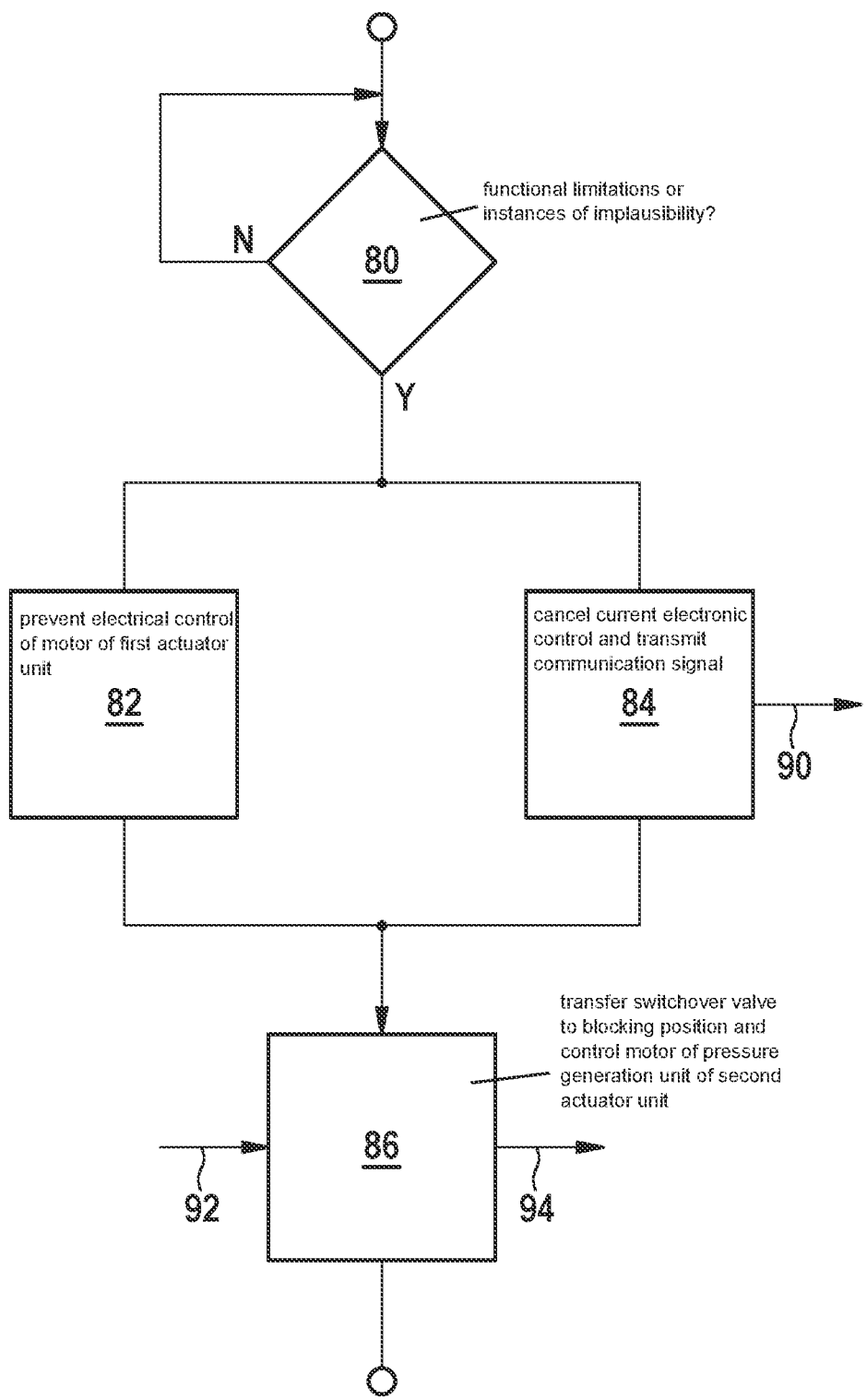
FIG. 2 shows flow chart for a method for controlling this power brake system in accordance with an example embodiment of the present invention.

The explained method for controlling a power brake system 10 of a motor vehicle engaged in piloted driving is illustrated once more by the flow chart shown in FIG. 2.

In a first step 80 of this method, the voltage supply of first actuator unit 12*a* is checked with the aid of a monitoring device 70.

If this monitoring device 70 detects functional limitations or instances of implausibility in the functioning of the voltage supply of first actuator unit 12*a*, which may precede a potential malfunction of this first actuator unit 12*a*, then electrical control of motor 24*a* of first actuator unit 12*a* is prevented by assigned, first electronic control device 16*a* (step 82).

Concurrently to that, in step 84, the current electronic control of circuit separating valves 40 and pressurized-media intake valves 32 is cancelled, and a communications signal 90 is transmitted to electronic control device 16*b* of second actuator unit 12*b*.

Electronic control device 16*b* of second actuator unit 12*b* subsequently transfers switchover valve 60 to the blocking position and controls motor 24*b* of pressure generation unit 22*b* of second actuator unit 12*b*, in order to generate a brake pressure in brake circuit 20 (step 86). Electronic control device 16*b* utilizes signals 92 of the braking-intent detection device of first actuator unit 12*a*, in order to determine a control signal for this motor 24*b*.

Therefore, as a result, the brake pressure prevailing in a brake circuit 20 during a braking action is generated by second actuator unit 12*b*, and, ideally, the driver does not perceive any changed braking performance of the power brake system. Finally, an acoustic and/or an optical warning and/or information signal 94 is transmitted by one of the electronic control devices 16 to the driver; using the warning and/or information signal, for example, the functional limitation being indicated to the driver, and the driver being asked to have the power brake system checked in an authorized service center. In addition, activation of piloted vehicle operation of the vehicle is prevented, or a piloted vehicle operation already present is aborted.

Of course, changes or additions to the described method are possible without departing from the main idea of the present invention.

What is claimed is:

1. A method for controlling a power brake system capable of controlling traction electronically for a motor vehicle engaged in piloted driving, the power brake system including a first voltage supply configured for powering a first electronic control device of a first actuator unit, the first actuator unit being equipped with a braking-intent detection device manipulable by a driver, configured to detect a braking intent, and a first pressure generation unit which includes an electrically controllable motor and a first pressure generator driven by the motor to generate a brake pressure in a brake circuit of the power brake system as a function of the detected braking intent, the power brake system further including a second voltage supply independent of the first voltage supply, configured for powering an independent, second electronic control device of a second actuator unit, the second actuator unit including a second pressure generation unit capable of being driven by a second electrically controllable motor, and the power brake system further including a monitoring device configured to at least monitor the first voltage supply of the first actuator unit, the method comprising:

based on detecting, by the monitoring device, a functional limitation in the first voltage supply of the first actuator unit, which precedes a malfunction, setting a brake pressure, which is requested as needed, in the brake circuit, by the second pressure generation unit of the second actuator unit, wherein devices of the first actuator unit are used for generating signals representing the braking intent and delivering the signal representing the braking intent to the second pressure generation unit, and, using pressurized-media intake valves and pressurized-media exhaust valves of the first actuator unit, traction control and/or driving stability control functions continue to be carried out as required.

2. The method for controlling a power brake system as recited in claim 1, wherein when the second motor of the second pressure generation unit is controlled electrically in order to adjust the brake pressure in the brake circuit, electrical control of the motor driving the first pressure generator of the first pressure generation unit is stopped.

3. The method for controlling a power brake system as recited in claim 1, wherein signals of the braking-intent detection device of the first actuator unit are taken into account in a determination of a control signal for the second motor of the second pressure generation unit by the second electronic control device.

4. The method for controlling a power brake system as recited in claim 1, wherein when a build-up of brake pressure is transferred to the second actuator unit, a power requirement of the first actuator unit is reduced in such a manner, that the first actuator unit continues to be functional with the exception of its first pressure generation unit.

5. A motor vehicle engaged in piloted driving, comprising:

a power brake system, which is capable of controlling traction electronically, the power brake system including a first voltage supply configured for powering a first electronic control device of a first actuator unit, the first actuator unit being equipped with a braking-intent detection device manipulable by a driver, configured to detect a braking intent, and a first pressure generation unit which includes an electrically controllable motor and a first pressure generator driven by the motor to generate a brake pressure in a brake circuit of the power brake system as a function of the detected braking intent, the power brake system further including a second voltage supply independent of the first voltage supply, configured for powering an independent, second electronic control device of a second actuator unit, the second actuator unit including a second pressure generation unit capable of being driven by a second electrically controllable motor, and the power brake system further including a monitoring device configured to at least monitor the first voltage supply of the first actuator unit;

wherein based on detecting, by the monitoring device, a functional limitation in the first voltage supply of the first actuator unit, which precedes a malfunction, the motor vehicle is configured to set a brake pressure, which is requested as needed, in the brake circuit, using the second pressure generation unit of the second actuator unit, and wherein devices of the first actuator unit are used for generating signals representing the braking intent and delivering the signal representing the braking intent to the second pressure generation unit, and, using pressurized-media intake valves and pressurized-media exhaust valves of the first actuator unit, traction control and/or driving stability control functions continue to be carried out as required.

\* \* \* \* \*